Oct. 18, 1955     P. ROUX     2,720,970
EXTRUSION PRESS
Filed May 29, 1951     5 Sheets-Sheet 1
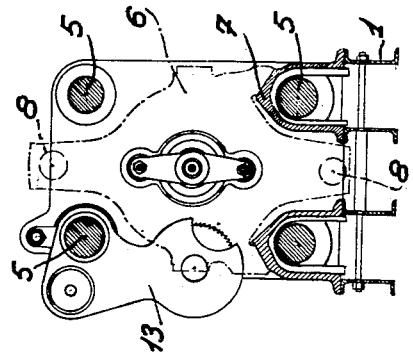
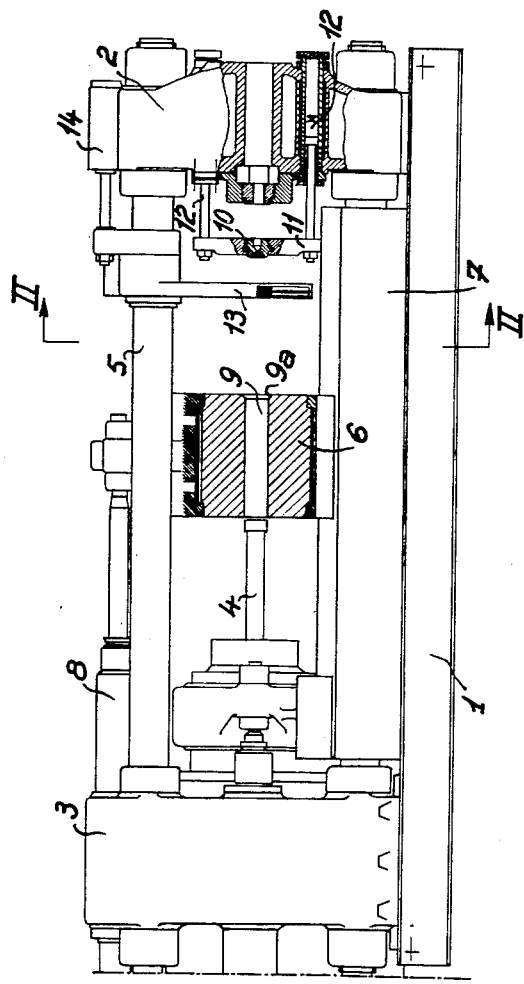
Inventor:
Pierre Roux
by
Stevens, Davis, Miller & Mosher
his attorneys

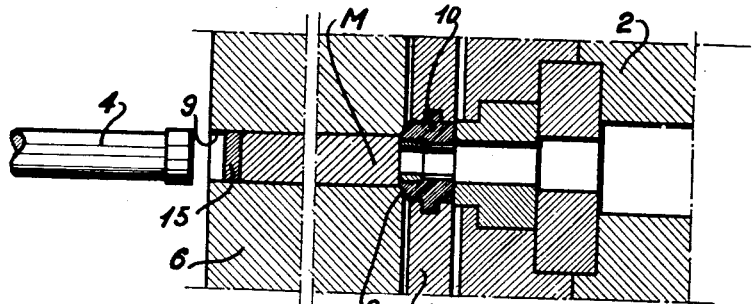
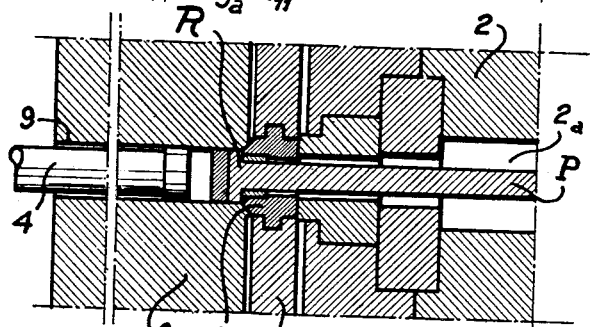
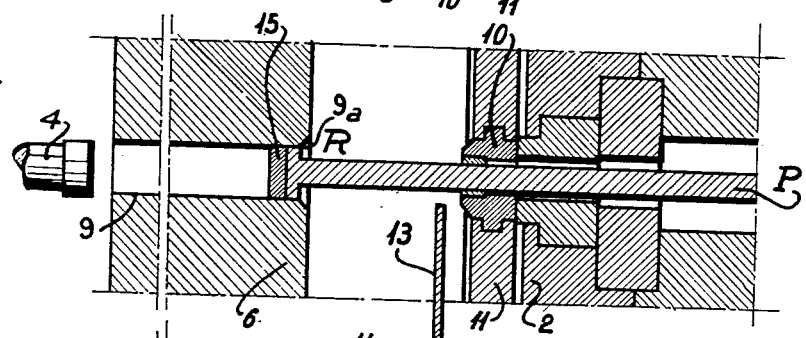
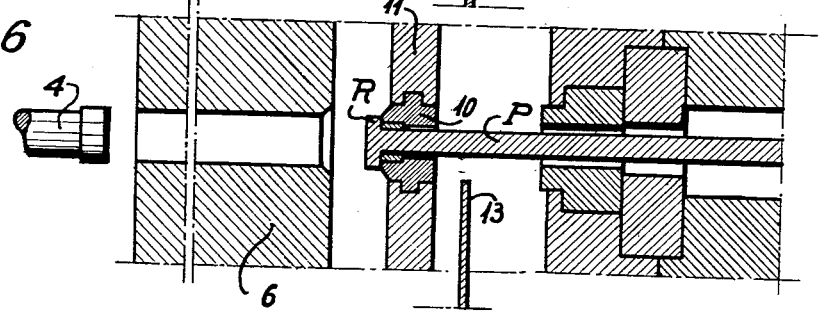

Oct. 18, 1955
P. ROUX
2,720,970
EXTRUSION PRESS
Filed May 29, 1951
5 Sheets-Sheet 3
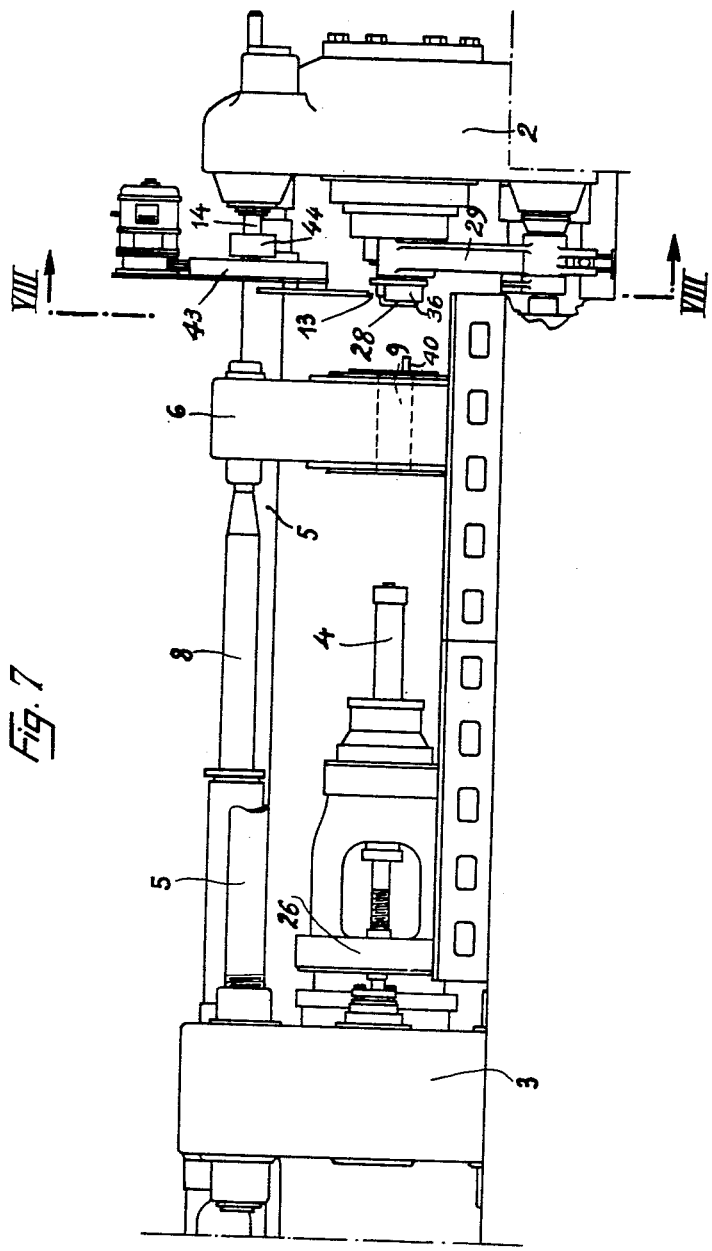
Inventor
Pierre Roux
by Stevens, Davis, Miller & Mosher
his attorneys Oct. 18, 1955  P. ROUX  2,720,970
EXTRUSION PRESS
Filed May 29, 1951  5 Sheets-Sheet 4

Oct. 18, 1955  P. ROUX  2,720,970
EXTRUSION PRESS
Filed May 29, 1951  5 Sheets-Sheet 5

Inventor
Pierre Roux
by
Stevens, Davis Miller & Mosher
his attorneys

United States Patent Office 2,720,970
Patented Oct. 18, 1955

2,720,970

EXTRUSION PRESS

Pierre Roux, Paris, France

Application May 29, 1951, Serial No. 228,817

Claims priority, application France December 9, 1950

5 Claims. (Cl. 207—9)

The present invention relates to extrusion presses in which the mass of metal to be extruded is placed inside a cylindrical vessel, hereafter called "container," which is closed at one end by a suitable die whose shape corresponds to the cross-section of the desired product. The metal is forced through this die by means of a movable cylindrical member, hereafter called "ram," which acts at the other end of the cotnainer, this operation being known as "direct extrusion."

In such machines, the whole amount of metal cannot be forced through the die; indeed, at the end of each stroke, there remains a residue which may, in certain cases, be very thin, but which always exists. This residue secures the extruded product to the die, and it is necessary, before starting a subsequent stroke, to sever it from the product.

In conventional extrusion presses with a movable container, the die is fast with the bed of the machine and the container can move axially with respect to the bed. In order to withdraw the extruded product, the container is driven away from the bed, i. e. from the die. As a rule, the residue adheres to the wall of the container and drags along the product which moves back through the die, by a length equal to the displacement of the container. There is thus created a free space crossed by the product which can then be severed from the residue, by means of a saw. The product is withdrawn from the machine and the residue is ejected from the container by means of the ram.

These extrusion presses have a serious inconvenience, viz. during the rearward motion of the container, the residue may get loose from the wall of the latter. In such a case, the residue cannot be drawn away from the die and hence sawing is impossible.

The present invention has for its object an improved extrusion press wherein the die is fitted up in such a way as to allow separation thereof from the bed against which it rests during normal operation, and displacement thereof towards the container in order to free a portion of the extruded product, between the die and the bed, for sawing this product.

Hence, it is always possible to easily sever the product from the residue. Indeed, if the residue adheres to the container, during the rearward motion of the latter, severing is performed as described above in the case of conventional machines. However, if the residue comes loose from the container and remains stuck to the die, the latter is merely displaced in the same direction as the container, and the product is cut between the die and the bed.

The arrangement of the invention is quite different from the known so-called "slide" arrangement wherein the die is capable of sliding inside the bed, towards the rear of the latter, i. e. in a direction opposite to the container. On the contrary, the die, according to the invention, is adapted for displacement in the direction of the container, away from the bed.

A further object of the invention is to provide means for displacing the die with respect to the bed. In a form of the invention, the die is fitted up on a cross-piece which is controlled by hydraulically-operated jacks carried by the bed; this cross-piece is applied against the bed during the extrusion stroke and moved away therefrom, if need be, for severing the extruded product.

In another form of the invention, these jacks associated with the die are done without and the conventional control jacks of the container are resorted to for dragging the die away from the bed simultaneously with the container and in the same direction. For this purpose, means are provided for temporarily securing the die to the container, in order to allow simultaneous displacement of both. This arrangement allows in particular lateral displacement of the die, since no individual jack is provided which connects the die to the bed.

A still further object of the invention is to provide means for laterally displacing the die, after the severing operation, thus allowing of overhauling the die and even replacing it, while the residue is being ejected from the container.

Other objects and advantages of the invention will be apparent during the course of the following description.

In the accompanying drawing forming a part of this invention and in which like numerals are employed to designate like parts throughout the same, Fig. 1 is a side elevation, with partial axial section, of an extrusion press according to the invention, Fig. 2 is a cross-section of this press taken along line II—II of Fig. 1, Figs. 3 to 6 are fragmentary diagrammatic sections illustrating the operation of this press, Fig. 7 is a side elevation of another form of press according to the invention, Fig. 8 is a cross-section, on an enlarged scale, taken along line VIII—VIII of Fig. 7.

Figure 8:
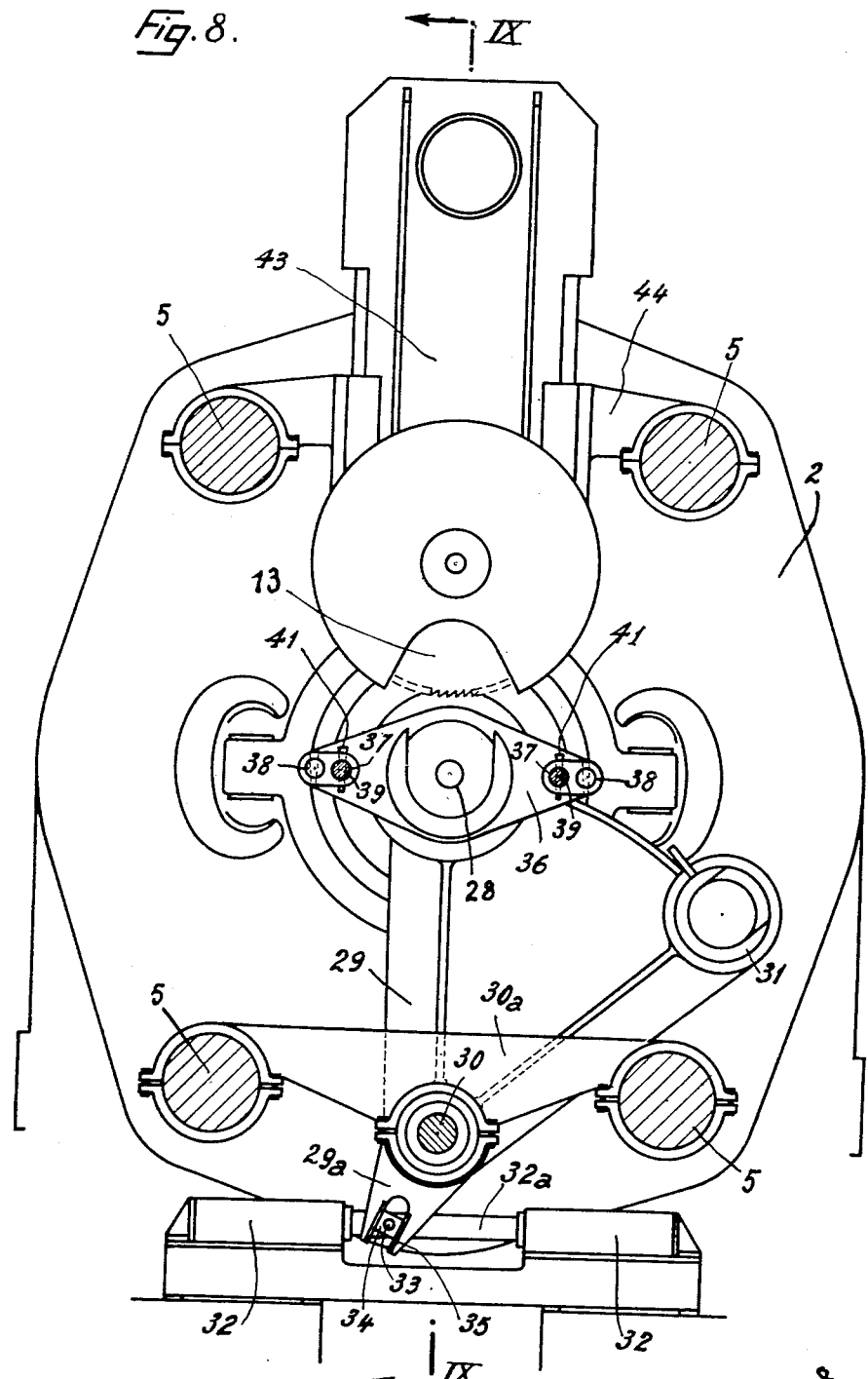
Figure 9:
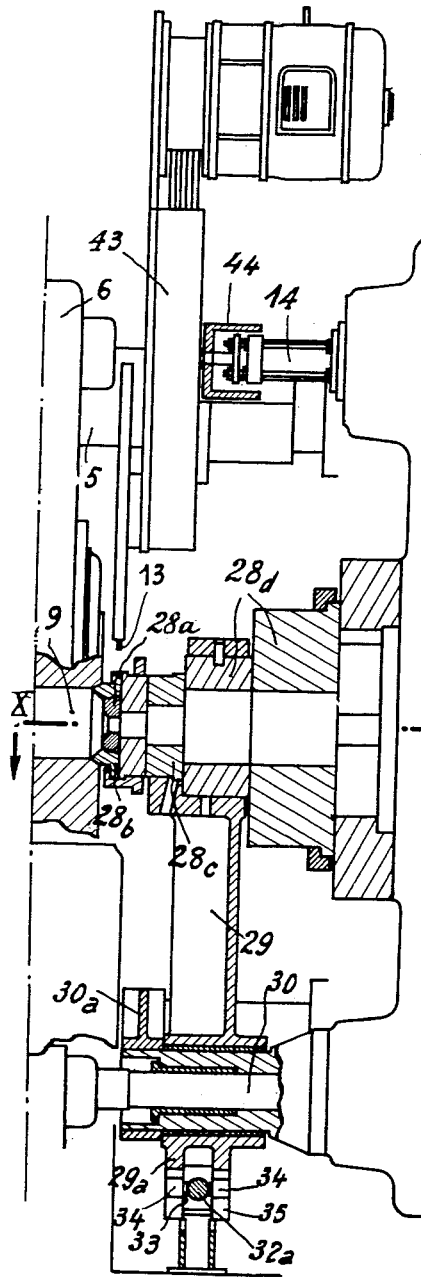
Fig. 9 is a section taken along line IX—IX of Fig. 8.

In the embodiment illustrated in Figs. 1 and 2, the extrusion press comprises a support-frame 1 at one end of which the bed 2 is fitted up, whereas the other end carries a thrust-block 3 which bears the reaction of the ram 4. The bed 2 and the block 3 are connected through ties 5. In the central portion of the press is arranged a container 6 which can slide along rails 7 fast with the frame 1, when urged by double-action hydraulic jacks 8. Opposite the ram 4, the container 6 is provided with a cylindrical bore 9 into which the mass of metal to be extruded is introduced.

A die 10 coaxially located with respect to the bore 9, is fitted up on a vertical cross-piece 11 which rests against the bed 2, during normal operation, but which can otherwise be displaced by means of double-action hydraulically-operated jacks 12. A retractable circular saw 13 is slidably and pivotally arranged on one of the ties 5, and a double-action jack 14 enables to displace this saw along the said tie. The saw 13 may be angularly displaced or swung anti-clockwise about the tie 5 (as shown in Figure 2), for example by hand, in order to cut the extruded product either in front of the die, or between the rods of the jacks 12 provided the die is spaced from the bed (as shown in Fig. 1).

The operation of the above-described machine is illustrated in Figs. 3 to 6 in which only the members strictly required for the understanding of this operation, have been shown.

In a first stage (Fig. 3), the mass of metal M is introduced into the bore 9 of the container 6. The die 10 rests against the bed 2, and the container 6 is moved into contact with the die 10, by means of the jacks 8 shown in Figs. 1 and 2. The die 10 accurately fits in a conical inlet 9a of the bore 9. A cylindrical pusher member 15 on which the action of the ram 4 is exerted, is inserted behind the mass M, inside the bore 9.

When pressure is exerted by the ram 4, the metal is forced through the die 10 and the extruded product P (Fig. 4) issues from the central opening 2a of the bed 2. The whole amount of metal cannot be extruded through the die, and there always remains, in the bore 9, a certain amount of residue R. The relative positions of the various elements, at the end of the stroke of the ram, are shown in Fig. 4.

In order to remove the extruded product P from the machine, it is necessary to eliminate the residue R. For this purpose (see Fig. 5), the container 6 is moved away from the bed 2, by means of the jacks 8. As a rule, the residue R sticks to the wall of the bore 9 and, as the container 6 moves backwards, it drags along the extruded product which passes back through the die 10. When a sufficient portion of the extruded product is freed, it is possible to cut it, by means of the saw 13, in the vicinity of the residue, and the product may be removed from the machine. This residue is then ejected by means of the ram 4 and the machine is ready for a new stroke.

However, when the container 6 moves backwards, the residue R may get loose from the container and the product remains stuck to the die 10. In such a case, the operation is very simple (see Fig. 6). After the container has been driven back, the double-action jacks 12 (shown in Fig. 1) are actuated and they push the cross-piece 11 with its die 10 away from the bed 2. Thus a sufficient length of the product P is freed, and the latter can be cut at the desired point by means of the saw 13. The product P is removed from the machine, and the residue is withdrawn in any convenient manner. The machine is then ready for a new stroke.

In another embodiment, illustrated in Figs. 7 to 10, the machine is provided with a device enabling to overhaul or even to replace the die, while the residue is being ejected.

In this device, the die assembly 28—including the die properly speaking 28a, its housing 28b, its thrustblock 28c, and the wedges 28d (see Fig. 9)—is fitted up on an axially displaceable cross-piece 36 carried on a support 29 which is mounted for lateral displacement relatively to the press i. e. in a plane perpendicular to the axis of the press. In the illustrated example, the support 29 comprises (see Fig. 8) a rocking-member pivoting about an axle 30 parallel to the axis of the machine and carried, on the one hand, by the bed 2 and, on the other hand, by a crossbeam 30a mounted on the lower ties 5.

The rocking-member 29 has the shape of a sector carrying at one end the die assembly 28 and at the other end a tubular receptacle 31 whose diameter is greater than that of the bore 9 through the container 6. This sector bears, underneath the axle 30, a protruding portion 29a which extends on either side of a rod 32a common to two transversely-disposed jacks 32. This rod is provided with a pin 33 pivotally carrying two slide-members 34 guided along grooves 35 of the extension 29a. When the jacks 32 are actuated, the rocking-member 29 swings, in the corresponding directions, into one of its two operative positions: in one of these positions, the die is located opposite the bore 9 and in the other it is shifted sideways and the receptacle 31 lies opposite this bore.

This modified extrusion press operates similarly to the former one. The ram 4 driven by an appropriate mechanism 26 forces the metal lying inside the bore 9 of the container 6, through the die 28, the rocking-member 29 being in the position in which the die is opposite the bore 9, and the container being in contacting engagement with said die.

As stated above, there always remains a residue which usually remains in bore 9, so that by displacing rearwardly the container 6, a portion of the extruded product is disengaged, between this container and the die, and the product can be severed, by sawing, from the residue. After removal of the product, the jacks 32 are actuated so as to swing the rocking-member 29 into its other position, i. e. the position in which the receptacle 31 comes opposite the bore 9, the die being shifted sideways. In this position, the residue is ejected, by means of the ram, into this receptacle, and, in the meantime, the die is overhauled and can be easily and quickly replaced, if necessary.

If however, as it sometimes happens the residue gets loose from the container and sticks to the die, the operation performed is the same as that described with reference to the machine of Figs. 1 to 6, i. e. the cross-piece 36 carrying the die 28 is axially displaced away from the bed 2 and towards the container 6, thus providing for a free portion of extruded product on which sawing can be effected.

This axial displacement of the cross-piece can be controlled, as in the previous case, by means of double-action jacks. However an object of the present invention is to provide simple means for temporarily and selectively securing the cross-piece to the rocking-member 29 or to the container 6; the cross-piece is secured to the rocking-member during normal operation, and to the container, in case the residue gets loose from the bore, in order to allow severing the product.

Figure 10:
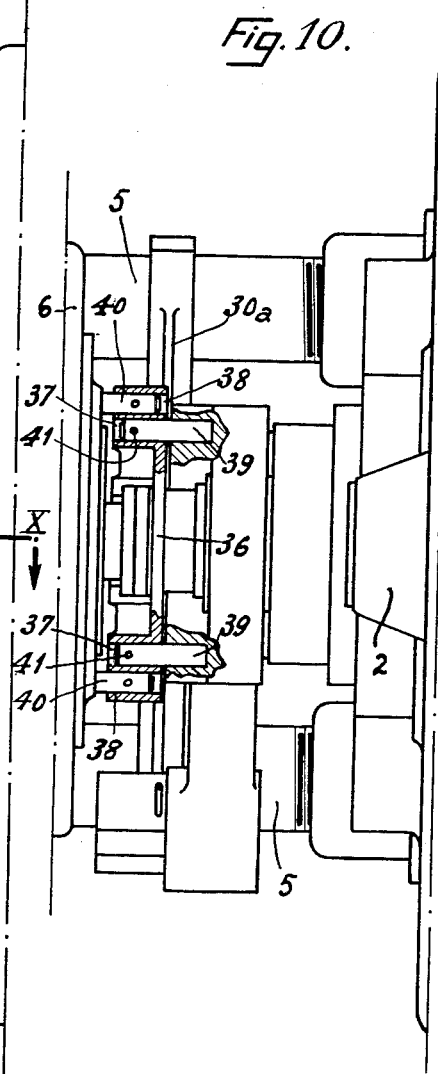
Fig. 10 is a section taken along line X—X of Fig. 9.

In the example of Figs. 8 and 10, the cross-piece 36 comprises, at each end, two bores 37 and 38; the rocking-member 29 is provided with two pegs 39 adapted to engage the bores 37; and the container 6 is provided with two pegs 40 adapted to engage the bores 38. The pegs 39 and 40 as well as the cross-piece 36 are pierced with holes adapted to come in register with each other for receiving securing pins 41. Thus the insertion of the pins 41 through the bores 37 and the pegs 39 secures the cross-piece 36 to the rocking-member 29, thus preventing axial displacement of this cross-piece from the bed of the machine; alternatively, when the pins 41 are introduced through the bores 38 and the pegs 37, the cross-piece is secured to the container 6. In this latter case, when the container is driven away from the bed, it drags along the cross-piece, thus freeing a portion of the extruded product, between the die and the rocking-member.

Instead of using a swingingly-mounted saw as in the case of Figs. 1 and 2, the machine of Figs. 7 to 10 is provided with a circular saw 13 carried on a vertical housing 43 which can slide upwards or downwards relatively to a carriage 44 supported by the upper ties 5. A double-action jack 14 located at the top part of the bed 2, controls the longitudinal displacement of this carriage.

What I claim is:

1. An extrusion press comprising a bed with a longitudinal passage therethrough having a front end, a container longitudinally movable with respect to said bed towards and away from said end, a die assembly including a die, a support for said die assembly, between said bed and said container, transversely movable with respect to said bed and adapted to bring said die in register with said passage at said end thereof and to laterally withdraw said die from said passage, removable fastening means for temporarily securing said die assembly to said support, and removable fastening means for temporarily securing said die assembly to said container, whereby said die assembly is longitudinally moved away from said bed on moving the container away from said bed.

2. An extrusion press as claimed in claim 1, wherein the removable fastening means include two spaced longitudinally extending housings in said die assembly, a protruding member fast with said support and adapted to freely engage one of said housings, a protruding member fast with said container and adapted to freely engage the other of said housings, and a removable fastening member adapted to secure one of said protruding members in the corresponding housing.

3. An extrusion press as claimed in claim 1, wherein said support is swingable about a longitudinally extending axle carried by said bed.

4. An extrusion press as claimed in claim 3, further comprising a receptacle laterally spaced from and fast with said support, the distances from said axle of said support and said receptacle being substantially equal.

5. An extrusion press as claimed in claim 1, further comprising a receptacle laterally spaced from and fast with said support, said receptacle being adapted to register with said passage when said die is laterally withdrawn from said passage.

References Cited in the file of this patent

UNITED STATES PATENTS

| | | |
|---|---|---|
| 1,011,522 | Summey | Dec. 12, 1911 |
| 1,258,738 | Benjamin | Mar. 12, 1918 |
| 1,935,286 | Born | Nov. 14, 1933 |
| 2,142,704 | Sparks | Jan. 3, 1939 |
| 2,188,076 | Dinzl | Jan. 30, 1940 |